United States Patent
Morioka et al.

(10) Patent No.: US 10,397,919 B2
(45) Date of Patent: Aug. 27, 2019

(54) MOBILE COMMUNICATION DEVICE AND METHOD FOR ALLOCATING RESOURCES OUTSIDE OF A VIRTUAL CARRIER BASED ON UE CAPABILITIES

(71) Applicant: SONY CORPORATION, Tokyo (JP)

(72) Inventors: Yuichi Morioka, Reading (GB); Matthew Webb, London (GB); Hideji Wakabayashi, Reading (GB); Dimitris Koulakiotis, Limassol (CY); Stephen Truelove, Ambleside (GB)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 14/655,421

(22) PCT Filed: Jan. 17, 2014

(86) PCT No.: PCT/GB2014/050143
§ 371 (c)(1),
(2) Date: Jun. 25, 2015

(87) PCT Pub. No.: WO2014/114920
PCT Pub. Date: Jul. 31, 2014

(65) Prior Publication Data
US 2015/0365945 A1    Dec. 17, 2015

(30) Foreign Application Priority Data
Jan. 24, 2013  (GB) .................................. 1301289.3

(51) Int. Cl.
*H04W 72/04* (2009.01)
*H04L 5/00* (2006.01)
*H04W 92/10* (2009.01)

(52) U.S. Cl.
CPC ....... *H04W 72/0453* (2013.01); *H04L 5/0064* (2013.01); *H04L 5/0094* (2013.01);
(Continued)

(58) Field of Classification Search
CPC ................................................. H04W 72/0453
See application file for complete search history.

(56) References Cited

U.S. PATENT DOCUMENTS

2005/0259684 A1*  11/2005  Csapo .................. H04W 28/20
                                                          370/468
2009/0213806 A1    8/2009  Ode
(Continued)

FOREIGN PATENT DOCUMENTS

CN    1926842 A       3/2007
EP    1 906 689 A1    4/2008
(Continued)

OTHER PUBLICATIONS

U.S. Appl. No. 14/650,935, filed Jun. 10, 2015, Morioka et al.
(Continued)

*Primary Examiner* — John D Blanton
(74) *Attorney, Agent, or Firm* — Xsensus LLP

(57) ABSTRACT

A communications device configured to receive data from a mobile communications network including one or more network elements providing a wireless access interface. The wireless access interface provides plural communications resource elements across a host frequency bandwidth, and includes, within the host frequency bandwidth, first communications resource elements within a first frequency bandwidth for allocation preferably to reduced capability devices to receive signals representing data transmitted by a transmitter within the first bandwidth forming a first virtual carrier, the reduced capability devices each having a receiver bandwidth greater than or equal to the first frequency bandwidth but less than the host frequency bandwidth. Communications devices of different capabilities can be allocated communications resources within different frequency ranges according to their capability, to relieve congestion on a center frequency of communications resources
(Continued)

Example operation (ePDCCH-like VC-PDCCH)

in which communications devices with a minimum bandwidth capability must receive communications resources for receiving down link signals.

19 Claims, 10 Drawing Sheets

(52) U.S. Cl.
CPC .......... *H04W 72/048* (2013.01); *H04L 5/001* (2013.01); *H04L 5/0091* (2013.01); *H04W 92/10* (2013.01)

(56) References Cited

U.S. PATENT DOCUMENTS

| | | | |
|---|---|---|---|
| 2009/0303941 A1 | 12/2009 | Naka et al. | |
| 2013/0114587 A1* | 5/2013 | Khoryaev | H04L 5/0094 370/343 |
| 2014/0023016 A1 | 1/2014 | Mildh et al. | |
| 2014/0036820 A1* | 2/2014 | McNamara | H04L 5/0007 370/329 |

FOREIGN PATENT DOCUMENTS

| | | |
|---|---|---|
| EP | 2 262 333 A1 | 12/2010 |
| GB | 2487909 A | 8/2012 |
| JP | 2009-542136 | 11/2009 |
| RU | 2 406 264 C2 | 12/2010 |
| WO | WO 2008/089369 A2 | 7/2008 |
| WO | 2012/104629 A2 | 8/2012 |
| WO | WO 2012/104629 A2 | 8/2012 |
| WO | WO 2012/104634 A1 | 8/2012 |
| WO | WO 2012/104635 A1 | 8/2012 |
| WO | WO 2012/104644 A1 | 8/2012 |
| WO | 2012/141628 A1 | 10/2012 |
| WO | WO 2012/141628 A1 | 10/2012 |
| WO | 2012/172323 A1 | 12/2012 |
| WO | WO 2012/172323 A1 | 12/2012 |

OTHER PUBLICATIONS

U.S. Appl. No. 14/650,927, filed Jun. 10, 2015, Webb, et al.
U.S. Appl. No. 14/651,882, filed Jun. 12, 2015, Webb, et al.
International Search Report dated Apr. 23, 2014 in PCT/GB2014/050143.
Search Report dated Jul. 26, 2013 in United Kingdom Patent Application No. GB1301289.3.
"3$^{rd}$ Generation Partnership Project; Technical Specification Group Radio Access Network; Study on provision of low-cost MTC UEs based on LTE; (Release 11)" 3$^{rd}$ Generation Partnership Project, XP050601305, Jun. 11, 2012, 44 Pages.
Office Action issued in corresponding Chinese Application No. 2014800060890 dated Feb. 5, 2018 (with English translation).
HTC, "Possible Approaches and Impacts of Low-Cost MTC UEs based on LTE," 3GFP TSG RAN WG1 Meeting #66bis, R1-113560, Zhuhai, China, Oct. 10-14, 2011.
Japanese Office Action dated Aug. 22, 2017 in JP Application No. 2015-554242, 5 pages (with English Translation).
Telecom Italia, Text proposal for TR 36.888 on restriction techniques to low performance MTC UEs, 3GPP TSG-RAN WG1#69 R1-122859, 3GPP, May 18, 2012, 4 pages.
Russian Office Action dated Jun. 14, 2017 in application No. 2015135537, 6 pages.
Office Action issued in Chinese Application 2014800060890 dated Sep. 19, 2018.
Search Report and Office Action issued in European Application 14 700 789.2-1215 dated Jul. 9, 2018.
3GPP: 3rd Generation Partnership Project, "Technical Specification Group Radio Access Network; Study on Provision of Low-Cost MTC UEs based on LTE; (Release 11)", 3GPP TR 36.888 V2.0.0, 43 Pages total, (Jun. 2012).

\* cited by examiner

Virtual Carrier in Center Frequency

Wider Bandwidth Virtual Carrier with Altering Bandwidth support

Example operation

Example operation (ePDCCH-like VC-PDCCH)

Virtual Carrier Aggregation - Alt 1

Virtual Carrier Aggregation - Alt 2: with Cross Carrier Schedulig

MOBILE COMMUNICATION DEVICE AND METHOD FOR ALLOCATING RESOURCES OUTSIDE OF A VIRTUAL CARRIER BASED ON UE CAPABILITIES

CROSS-REFERENCE TO RELATED APPLICATIONS

The present application is based on PCT application PCT/GB/2014/050143 filed Jan. 17, 2014, and claims priority to British Patent Application 1301289.3, filed in the UK IPO on Jan. 24, 2013, the entire contents of each of which being incorporated herein by reference.

TECHNICAL FIELD OF THE DISCLOSURE

The present disclosure relates to communications devices, and methods of communicating using mobile communications devices, infrastructure equipment for mobile communications networks, mobile communications networks and systems and methods of communicating using mobile communications networks.

BACKGROUND OF THE DISCLOSURE

Mobile communications systems continue to be developed to provide wireless communications services to a greater variety of electronic devices. In more recent years, third and fourth generation mobile telecommunication systems, such as those based on the 3GPP defined UMTS and Long Term Evolution (LTE) architectures have been developed to support more sophisticated communications services to personal computing and communications devices than simple voice and messaging services offered by previous generations of mobile telecommunication systems. For example, with the improved radio interface and enhanced data rates provided by LTE systems, a user may enjoy high data rate applications such as mobile video streaming and mobile video conferencing that would previously only have been available via a fixed line data connection. The demand to deploy third and fourth generation networks is therefore strong and the coverage area of these networks, i.e. geographic locations where access to the networks is possible, is expected to increase rapidly.

More recently it has been recognised that rather than providing high data rate communications services to certain types of electronics devices, it is also desirable to provide communications services to electronics devices that are simpler and less sophisticated. For example, so-called machine type communication (MTC) applications may be semi-autonomous or autonomous wireless communication devices which may communicate small amounts of data on a relatively infrequent basis. Some examples include so-called smart meters which, for example, are located in a customer's house and periodically transmit information back to a central MTC server data relating to the customer's consumption of a utility such as gas, water, electricity and so on.

Whilst it can be convenient for a communications device such as an MTC type device to take advantage of the wide coverage area provided by a third or fourth generation mobile telecommunication network there are at present disadvantages. Unlike a conventional third or fourth generation communications device such as a smartphone, an MTC-type device is preferably relatively simple and inexpensive. The type of functions performed by the MTC-type device (e.g. collecting and reporting back data) do not require particularly complex processing to perform.

As will be appreciated, there may be a desire for many types of communications devices to conserve power. However this may be particularly applicable to MTC type devices, which are arranged to operate with a less sophisticated transceiver and may for example be low power and battery operated and for example may be deployed for a significant time before the batteries are to be replaced. Accordingly there is a desire to provide arrangements in which a power of all types of communications devices operating with a mobile communications networks can be conserved.

SUMMARY OF THE DISCLOSURE

Embodiments of the present disclosure can provide in one example a communication device for transmitting data to and receiving data from a mobile communications network. The mobile communications network includes one or more network elements providing a wireless access interface for the communications devices. The wireless access interface provides a plurality of communications resource elements across a host frequency range which is for example a full or host bandwidth available for the mobile devices to communicate via the mobile communications network. A full bandwidth may correspond to the uplink or the downlink of the mobile communications network. The mobile communications network is adapted to provide a wireless access interface to include within the host frequency bandwidth a first section of communications resource elements within a first frequency bandwidth for allocation preferably to reduced capability devices forming a first virtual carrier. The reduced capability devices each have a receiver bandwidth which is greater than or equal to the first frequency bandwidth but less than the host frequency bandwidth. The mobile communications network preferably allocates the communications resources to the reduced capability devices in the sense that the reduced capability devices are given priority to the communications resources of the first section of communications resources over the allocation of the communications resources to communications devices which are able to communicate using the full bandwidth of the host carrier of the mobile communications network. In one example, the first section of the communications resources forming the first virtual carrier is reserved for allocation to the reduced capability devices only, but in other examples, some of the communications resources of the first section of the first virtual carrier may be allocated to the full capability communications devices, if a demand for the communications resources from the reduced capability devices leaves some of the communications resources un-allocated.

A communications device is configured to transmit to the mobile communications network a relative capability of the communications device to transmit or receive the data via the wireless access interface, the relative capability comprising at least an indication of a relative bandwidth of the receiver to receive signals within the host frequency range greater than or equal to the first bandwidth. The mobile communications device is configured to receive an allocation of communications resources outside the the first virtual carrier in response to the indication of the relative capability of the device indicating that the communications device can receive radio signals outside the first virtual carrier.

According to the present technique communications devices of different capabilities can be allocated communications resources within different frequency ranges according to their capability, which can relieve congestion on a centre frequency of communications resources in which communications devices with a minimum bandwidth capability receive communications resources for receiving down link signals. This is because in some examples the centre frequencies include control channels which may be required to receive system information for communicating via the mobile communications network, such as synchronisation signals and cell parameters etc.

It is expected in the future that there may be many devices which have a reduced capability and which may be required to communicate within a virtual carrier bandwidth which may be less than the host bandwidth of a mobile communications network such as a 4G or LTE network. Since the number of devices may be relatively large, a technical problem exists because the number of communications devices wishing to communicate via the virtual carrier may produce congestion on, for example, a control channel or shared communications resources which are provided within the virtual carrier.

Embodiments of the present disclosure are therefore directed to address a technical problem of reducing an amount of congestion which may occur in a virtual carrier particularly in regard to a capacity of the communications channel. According to the embodiments of the present disclosure, a capacity of the virtual carrier is increased by providing a wireless access interface, which can exchange communications signals with a communications device in which the communications device informs the mobile network of its capability. Thus a communications device may have a different capability from other communications devices, and although operating in accordance with a reduced bandwidth capability mode, may be able to communicate that it has a capability to transmit and to receive radio signals outside a virtual carrier which is provided by the mobile communications network. Accordingly, if the communications device is capable of transmitting data to or receiving data from the mobile communications network outside the virtual carrier then the mobile network may allocate communications resources outside the virtual carrier for this communications device.

According to this present technique therefore, communications devices may be determined as belonging to different classes corresponding to different capabilities for transmitting or receiving data. The capabilities may include one of a radio frequency bandwidth of a transmitter or a receiver or a base band bandwidth of a transmitter or a receiver to the effect that depending upon the capability of the device, a mobile communications network may allocate resources for communicating via the wireless access interface in accordance with the relative capability of the device.

Further aspects and features of the present disclosure are defined in the appended claims, including but not limited to, a mobile communications device, a method of communicating, a network infrastructure element, a communications network and the method of communicating via a wireless access interface.

Various further aspects and embodiments of the disclosure are provided in the appended claims, including but not limited to, an infrastructure equipment, an infrastructure equipment, a communications device and method of receiving data from a mobile communications network element.

BRIEF DESCRIPTION OF DRAWINGS

Embodiments of the present disclosure will now be described by way of example only with reference to the accompanying drawings in which like parts are provided with corresponding reference numerals and in which.

DESCRIPTION OF EXAMPLE EMBODIMENTS

Example Network

Figure 1:
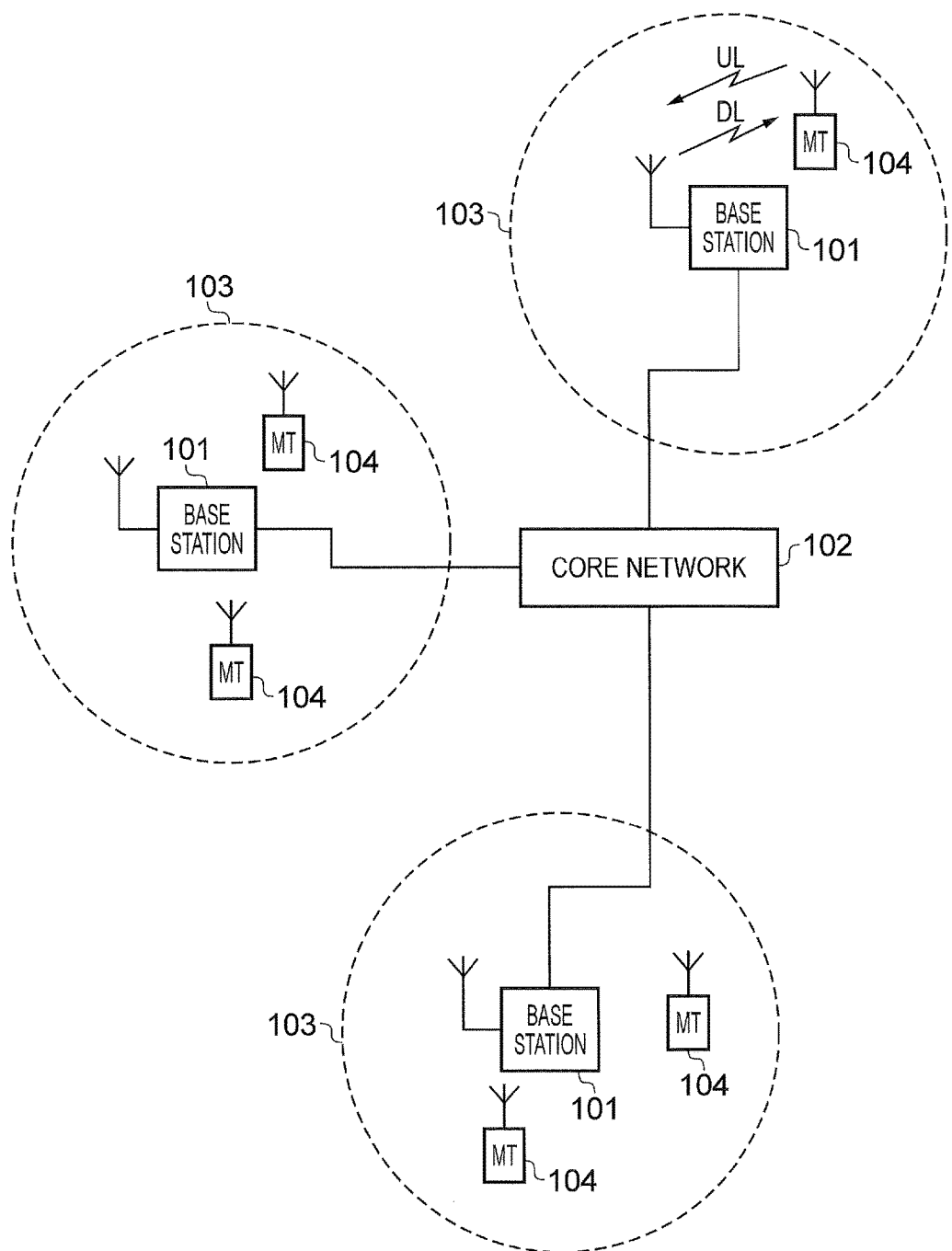
FIG. 1 provides a schematic diagram illustrating an example of a conventional mobile communications system.

FIG. 1 provides a schematic diagram illustrating the basic functionality of a conventional mobile communications system.

The network includes a plurality of base stations 101 connected to a core network 102. Each base station provides a coverage area 103 (i.e. a cell) within which data can be communicated to and from communications devices 104. Data is transmitted from a base station 101 to a communications device 104 within a coverage area 103 via a radio downlink. Data is transmitted from a communications device 104 to a base station 101 via a radio uplink. The core network 102 routes data to and from the base stations 104 and provides functions such as authentication, mobility management, charging and so on.

The term communications devices will be used to refer to a communications terminal or apparatus which can transmit or receive data via the mobile communications system. Other terms may also be used for communications devices such as personal computing apparatus, remote terminal, transceiver device or user equipment (UE) which may or may not be mobile.

Figure 2:
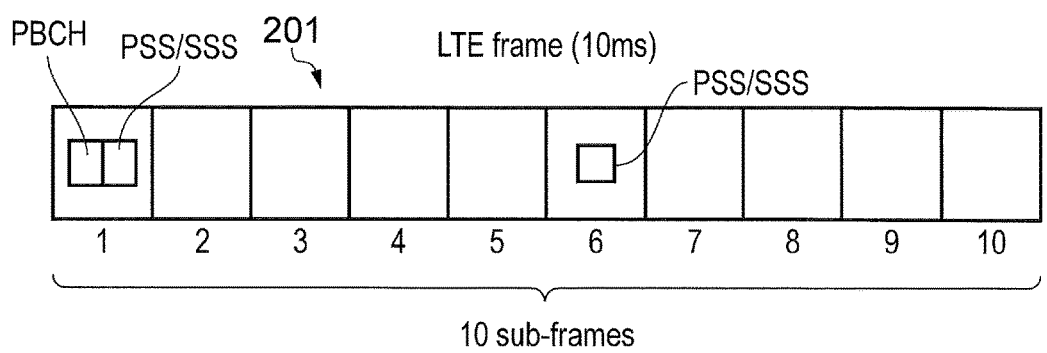
FIG. 2 provides a schematic diagram illustrating an arrangement of channels of a wireless access interface for ten down-link sub-frames of a conventional LTE wireless access interface.

Mobile telecommunications systems such as those arranged in accordance with the 3GPP defined Long Term Evolution (LTE) architecture use an orthogonal frequency division multiplex (OFDM) based radio access interface for the radio downlink (so-called OFDMA) and the radio uplink (so-called SC-FDMA). Data is transmitted on the uplink and on the downlink on a plurality of orthogonal sub-carriers. FIG. 2 shows a schematic diagram illustrating an OFDM based LTE downlink radio frame 201. The LTE downlink radio frame is transmitted from an LTE base station (known as an enhanced Node B) and lasts 10 ms. The downlink radio frame comprises ten sub-frames, each sub-frame lasting 1 ms. A primary synchronisation signal (PSS) and a secondary synchronisation signal (SSS) are transmitted in the first and sixth sub-frames of the LTE frame, in the case of frequency division duplex (FDD) system. A physical broadcast channel (PBCH) is transmitted in the first sub-frame of the LTE frame. The PSS, SSS and PBCH are discussed in more detail below.

Figure 3:
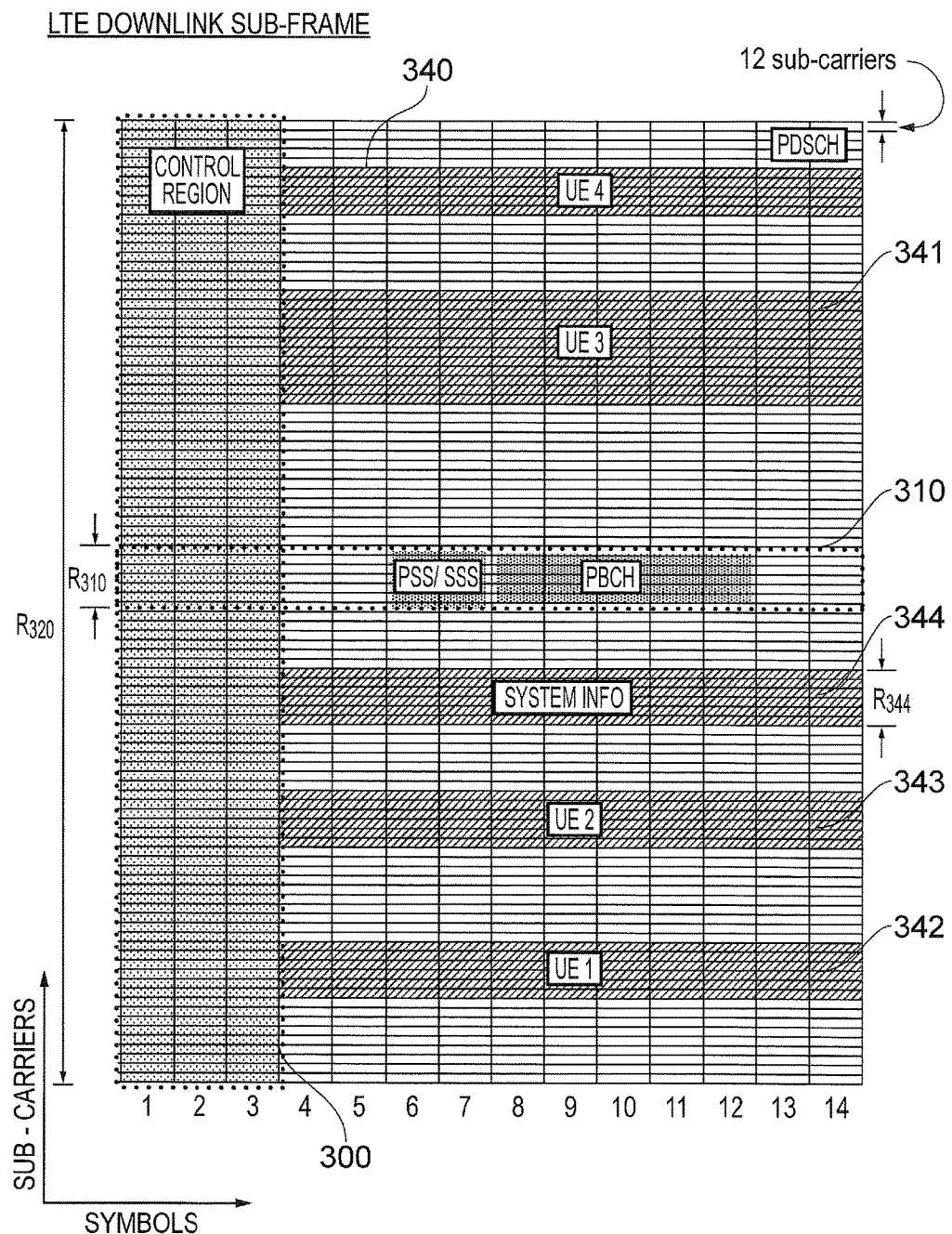
FIG. 3 provides a schematic diagram illustrating a conventional LTE downlink radio sub-frame.

FIG. 3 provides a schematic diagram providing a grid which illustrates the structure of an example of a conventional downlink LTE sub-frame. The sub-frame comprises a predetermined number of symbols which are transmitted over a 1 ms period. Each symbol comprises a predetermined number of orthogonal sub-carriers distributed across the bandwidth of the downlink radio carrier.

The example sub-frame shown in FIG. 3 comprises 14 symbols and 1200 sub-carriers spaced across a 20 MHz bandwidth. The smallest unit on which data can be transmitted in LTE is twelve sub-carriers transmitted over one sub-frame. For clarity, in FIG. 3, each individual resource element is not shown, but instead each individual box in the sub-frame grid corresponds to twelve sub-carriers transmitted on one symbol.

FIG. 3 shows resource allocations for four LTE devices 340, 341, 342, 343. For example, the resource allocation 342 for a first LTE device (UE 1) extends over five blocks of twelve sub-carriers, the resource allocation 343 for a second LTE device (UE2) extends over six blocks of twelve sub-carriers and so on.

Control channel data is transmitted in a control region 300 of the sub-frame comprising the first n symbols of the sub-frame where n can vary between one and three symbols for channel bandwidths of 3 MHz or greater and where n can vary between two and four symbols for channel bandwidths of 1.4 MHz. The data transmitted in the control region 300 includes data transmitted on the physical downlink control channel (PDCCH), the physical control format indicator channel (PCFICH) and the physical HARQ indicator channel (PHICH).

The PDCCH contains control data indicating which sub-carriers on which symbols of the sub-frame have been allocated to specific LTE devices. Thus, the PDCCH data transmitted in the control region 300 of the sub-frame shown in FIG. 3 would indicate that UE1 has been allocated the first block of resources 342, that UE2 has been allocated the second block of resources 343, and so on. In sub-frames where it is transmitted, the PCFICH contains control data indicating the duration of the control region in that sub-frame (i.e. between one and four symbols) and the PHICH contains HARQ (Hybrid Automatic Request) data indicating whether or not previously transmitted uplink data has been successfully received by the network.

In certain sub-frames, symbols in a central band 310 of the sub-frame are used for the transmission of information including the primary synchronisation signal (PSS), the secondary synchronisation signal (SSS) and the physical broadcast channel (PBCH). This central band 310 is typically 72 sub-carriers wide (corresponding to a transmission bandwidth of 1.08 MHz). The PSS and SSS are synchronisation signals that once detected allow the LTE device 104 to achieve frame synchronisation and determine the cell identity of the enhanced Node B transmitting the downlink signal. The PBCH carries information about the cell, comprising a master information block (MIB) that includes parameters that the LTE devices require to access the cell. Data transmitted to individual LTE devices on the physical downlink shared channel (PDSCH) can be transmitted in the remaining blocks of communications resource elements of the sub-frame. Further explanation of these channels is provided in the following sections.

FIG. 3 also shows a region of PDSCH containing system information and extending over a bandwidth of $R_{344}$. Thus in FIG. 3 the central frequency carries control channels such as the PSS, SSS and PBCH and therefore implies a minimum bandwidth of a receiver of a communications device.

The number of sub-carriers in an LTE channel can vary depending on the configuration of the transmission network. Typically this variation is from 72 sub carriers contained within a 1.4 MHz channel bandwidth to 1200 sub-carriers contained within a 20 MHz channel bandwidth as shown in FIG. 3. As is known in the art, subcarriers carrying data transmitted on the PDCCH, PCFICH and PHICH are typically distributed across the entire bandwidth of the sub-frame. Therefore a conventional LTE device must be able to receive the entire bandwidth of the sub-frame in order to receive and decode the control region.

Virtual Carrier

Certain classes of devices, such as MTC devices (e.g. semi-autonomous or autonomous wireless communication devices such as smart meters as discussed above), support communication applications that are characterised by the transmission of small amounts of data at relatively infrequent intervals and can thus be considerably less complex than conventional LTE devices. Communications devices may include a high-performance LTE receiver unit capable of receiving and processing data from an LTE downlink frame across the full carrier bandwidth. However, such receiver units can be overly complex for a device which only needs to transmit or to receive small amounts of data. This may therefore limit the practicality of a widespread deployment of reduced capability MTC type devices in an LTE network. It is preferable instead to provide reduced capability devices such as MTC devices with a simpler receiver unit which is more proportionate with the amount of data likely to be transmitted to the device. Furthermore, as explained above it is desirable to include features in a mobile communications network and/or communications devices which can conserve power consumption of the communications devices.

In conventional mobile telecommunication networks, data is typically transmitted from the network to the communications devices in a frequency carrier (first frequency range) where at least part of the data spans substantially the whole of the bandwidth of the frequency carrier. Normally a communications device cannot operate within the network unless it can receive and decode data spanning the entire frequency carrier, i.e. a maximum system bandwidth defined by a given telecommunication standard, and therefore the use of communications devices with reduced bandwidth capability transceiver units is precluded.

However, as disclosed in co-pending International patent applications numbered PCT/GB2012/050213, PCT/GB2012/050214, PCT/GB2012/050223 and PCT/GB2012/051326, the contents of which are herein incorporated by reference, a subset of the communications resource elements comprising a conventional carrier (a "host carrier") are defined as a "virtual carrier", where the host carrier has a certain bandwidth (host frequency bandwidth) and where the virtual carrier has a reduced bandwidth (virtual carrier frequency bandwidth) compared to the host carrier's bandwidth. Data for reduced capability devices is separately transmitted on the virtual carrier set of communications resource elements. Accordingly, data transmitted on the virtual carrier can be received and decoded using a reduced complexity or capability transceiver unit.

Devices provided with reduced complexity or capability transceiver units (hereafter referred to as "reduced capability devices") could operate by using a part of its full capability (i.e. reduced capability set of its full capability) or they could be constructed to be less complex and less expensive than conventional LTE type devices (onwards referred to generally as LTE devices). Accordingly, the deployment of such devices for MTC type applications within an LTE type network can become more attractive because the provision of the virtual carrier allows communications devices with less expensive and less complex transceiver units to be used.

Dynamic Allocation of Resources to Different Capability Receivers

Embodiments of the present technique can provide an arrangement in which a mobile communications network is configured to allocate communications resources which are outside a certain core frequency range, which forms a virtual carrier for reduced capability devices. However according to the present technique different classes of mobile communications devices are configured to communicate using the mobile communications network. As explained above, the mobile communications network including one or more network elements provides a wireless access interface for the communications devices. The wireless access interface provides a plurality of communications resource elements across a host frequency range, and at least one section of frequency resources within the host frequency band within a first frequency band, which forms a virtual carrier for reduced capability devices. The virtual carrier provides a plurality of communications resources for preferable allocation to the communications devices for receiving signals transmitted or received within the first frequency band.

According to the present technique, the communications device is configured to transmit to the mobile communications network a relative capability of the communications device to transmit or receive data via the wireless access interface, the relative capability comprising at least an indication of a bandwidth of the receiver. The mobile communications network responds by allocating communications resources outside the first virtual carrier in response to an indication that the relative capability of the device is such that the device can receive or transmit via the wireless access interface in communications resources which are outside the frequency range of the virtual carrier.

Embodiments of the present technique are therefore configured to provide an arrangement in which a communications device can select a supporting virtual carrier bandwidth which is less than the full bandwidth of the host system, but maybe different per communications device, according to its complexity and capability, data rate, etc. From the network side, an infrastructure element such as an eNodeB can be arranged to allocate communications resources within the wide system bandwidth according to the supported bandwidth signalled from the communications terminals. Accordingly, the present technique can provide for a flexible selection of supporting bandwidth for communications devices so that these devices can:

Enable the reuse of the PSS/SSS/PBCH in the host carrier for MTC devices

Provide more resource to MTC devices outside centre frequency, so as to reduce congestion on the centre frequencies;

Reduce the cost of MTC devices compared to legacy communications devices by reducing the supported RF/Baseband bandwidth (basic merit of a virtual carrier arrangement)

Figure 4:
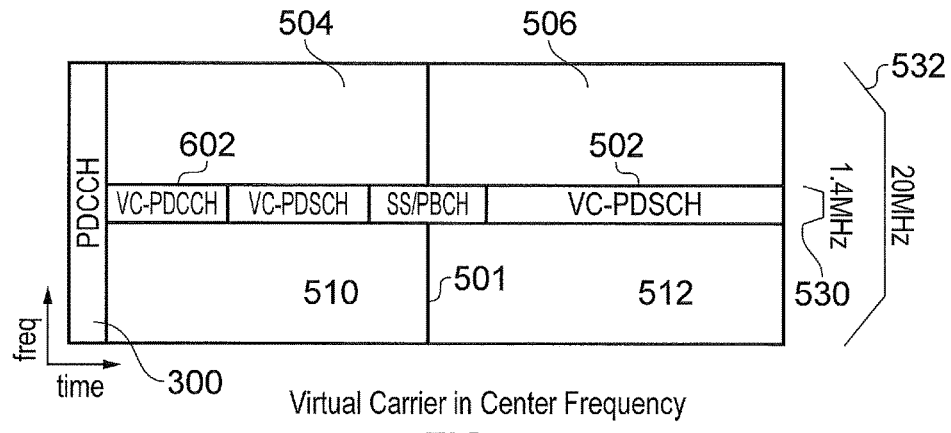
FIG. 4 provides a schematic diagram illustrating an LTE downlink radio sub-frame arranged to provide a narrow band virtual carrier including communications resources within a bandwidth which is narrower than a bandwidth of a host system.

FIG. 4 provides an example illustration which corresponds to that shown in FIG. 3 but with the virtual carrier forming a centre frequency of the wireless access interface and in which the sub-frame comprises two time slots delineated by a vertical line 501. As can be seen from FIG. 4, data transmitted on the virtual carrier 502 is transmitted across a limited bandwidth. This could be any suitable bandwidth providing it is smaller than that of the host carrier, which for example is 20 MHz. In the example shown in FIG. 4 the virtual carrier is transmitted across a bandwidth comprising resource blocks and sub-carriers which is equivalent to a 1.4 MHz transmission bandwidth. Accordingly, a device receiving data transmitted on the virtual carrier need only be equipped with a receiver capable of receiving and processing data transmitted over a bandwidth of 1.4 MHz. This enables reduced capability devices (for example MTC type devices) to be provided with simplified receiver units yet still be able to operate within an OFDM type communication network which, as explained above, conventionally requires devices to be equipped with receivers capable of receiving and processing an OFDM signal across the entire bandwidth of the signal. In keeping with a conventional LTE downlink sub-frame, the first n symbols (n is three in FIG. 4) form the control region 300 is reserved for the transmission of downlink control data such as data transmitted on the PDCCH.

As explained above, the centre frequencies may be an advantageous location to allocate a virtual carrier within a host carrier. This is because the Primary and Secondary Synchronization Signals (PSS/SSS) and Physical Broadcast Channel (PBCH) are located in the centre frequency and therefore can be more easily acquired by MTC communications devices, which can only receive the virtual carrier and so can reuse these PSS/SSS/PBCH channels. However, if MTC devices can only be allocated resources from a virtual carrier occupying the centre frequencies, then the resources of those centre frequencies may become congested. Accordingly the present technique can provide an arrangement for allocating resources from other parts of the host carrier wireless access interface in accordance with a capability of the devices. Such MTC devices may still be operating in a virtual carrier mode, receiving an allocation of resources, which are reserved or predetermined for allocation to MTC-type devices.

Figure 5:
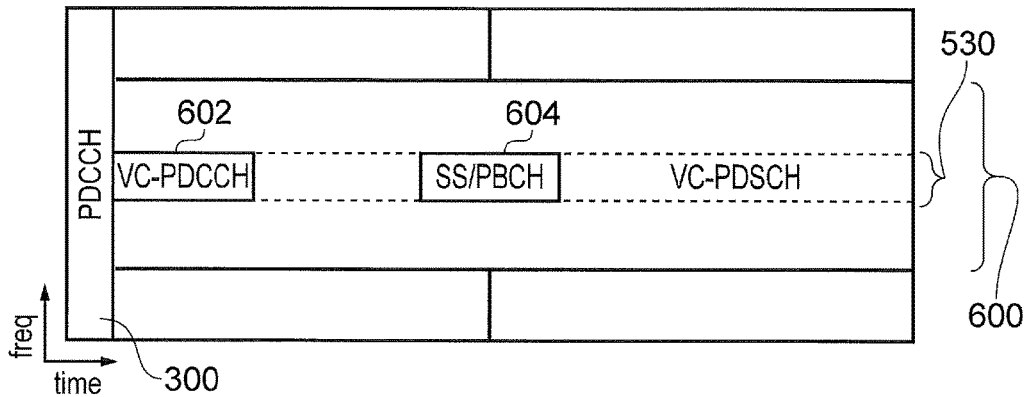
FIG. 5 provides a schematic diagram illustrating an LTE downlink radio sub-frame arranged to provide a narrow band virtual carrier which provides for an allocation of communications resources from a frequency range which is outside that of the narrow band virtual carrier of FIG. 4.

As explained above embodiments of the present technique have been provided to increase the bandwidth of a shared resource which may be allocated to communications devices which may have a different capability which may be less than the full capability so that whilst these devices can communicate within a predetermined frequency range they cannot communicate via the full bandwidth of the host system. Thus, as illustrated in FIG. 5 which corresponds to the diagram shown in FIG. 4 a separate frequency range 600 which is less than the host bandwidth of the wireless access interface is provided for allocation to reduce capability devices for classes of devices which can communicate within a greater frequency bandwidth than the virtual carrier bandwidth of the virtual carrier 502 shown in FIG. 4. Thus, as shown in FIG. 5 a virtual carrier control channel VC-PDCCH 602 is provided with an SS/PBCH 604 which corresponds to the examples shown in FIGS. 3 and 4 but are available to communications devices which can communicate in frequencies which are outside the virtual carrier bandwidth 530 of FIG. 4.

Embodiments of the present technique can therefore be viewed, in some examples, as a wider bandwidth virtual carrier, which is narrower than the host system bandwidth, with supporting bandwidth altered flexibly per communications devices. Furthermore, the common information that are intended to all VC UEs such as the broadcast information and control information (VC-PDCCH) have to be sent at the narrowest possible bandwidth so that all VC UEs are able to receive them.

Figure 6:
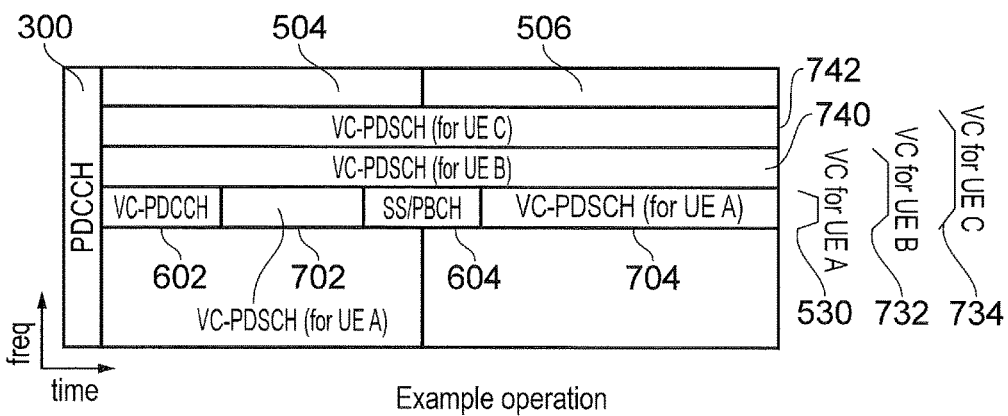
FIG. 6 provides a schematic diagram of an LTE downlink radio sub-frame which illustrates a wireless access interface provided by a mobile communications network which includes allocating communications resources outside the narrow band virtual carrier for three possible bandwidths including the narrow band virtual carrier.

An example embodiment of the present technique is illustrated in FIG. 6 in which a wireless access interface corresponding to that shown in FIGS. 4 and 5 is shown but illustrating an operation in which three classes of communications terminals are operating within the mobile communications network. As shown in FIG. 6, the virtual carrier, shown in FIG. 5, 530 is provided by the wireless access interface with the virtual carrier control channel 602 and the SS/BPCH 604 provided for communications terminals which can only communicate within the frequency bandwidth of the virtual carrier. Thus, reduced capability terminals of a first class (Class A) transmit requests for allocations of resources on the shared channel which are communicated on the downlink to allocate to the communications devices within the VC-PDCCH 602 and are allocated those shared resources within the virtual carrier bandwidth 530 in communications resources 702, 704. The central region provides the lowest available bandwidth which can be supported because this also includes the other control channels mentioned above (SS/PBCH).

According to the present technique there are other classes of communications terminals other than class A which can only communicate within the smallest bandwidth of a virtual carrier 530 for class A. As shown in FIG. 6, two other classes, class B and class C are illustrated which are able to communicate within communications resources within two wider bandwidths 732, 734. Thus, within the bandwidth 732 of the class B devices, communications resources are allocated to the class B devices within the second largest bandwidth 732. Accordingly, the class B bandwidth 732 provides a reserved set of communications resources, for preferable allocation within an extension of the virtual carrier bandwidth 530 to provide a shared communications resource for the class B devices within a frequency band 740. Communications devices are therefore capable of communicating within the second largest bandwidth 732. Similarly, for a class C device which is able to receive signals from within a bandwidth which is larger than the class B and class A devices 734, a separate band of communications resources within a section of the wireless access interface 742 is provided which are allocated to class C communications devices by the mobile communications network. Thus, a class C device may request downlink communications resources and may be allocated downlink communications resources by receiving a control channel signal from the virtual carrier downlink control channel VC-PDCCH 602. The down-link control channel VC-PDCCH 602 may allocate downlink communications resources within the bandwidth 734 for class C devices which may include the separate shared communications resources VC-PDSCH for class C devices 742 and may also include communications resources within the second class B shared channel 740 as well as the class A channel 530.

Accordingly, as will be appreciated from the example given in FIG. 6, there are various classes of devices, each class representing a bandwidth which that device can either transmit or receive communications resources and therefore the mobile network allocates communications resources in correspondence with the class of device and the ability of the devices within that class to receive downlink communications from different bandwidths than the virtual carrier. Thus according to the example shown in FIG. 6, a communications device of class A (class A UE) has the minimum capability and only supports 1.4 MHz. When an eNodeB sends data to this device (UE A), it makes sure that the resource allocated to it is within the centre 1.4 MHz. In contrast a device from class B (UE B) may support a larger bandwidth of 3 MHz, in which case, the eNodeB can allocate a 3 MHz wide resource to this device. In one example, the bandwidth of VC-PDCCH 602 needs to be receivable by all classes of devices operating under the virtual carrier system, and so needs to be limited to the narrowest maximum bandwidth that the MTC-type devices need to support (which is 1.4 MHz in the above case), so all MTC devices can properly receive this common information.

In other example embodiments of the present technique, the down-link control channel for allocating the communications resources of the shared channel to the communications device is a so-called enhanced down-link control channel or an ePDCCH-like design, which is applied to the virtual carrier arrangement (VC-PDCCH). Such embodiments can have an advantage because the common control information (VC-PDCCH) which needs to be read by all classes of devices is narrow bandwidth in nature.

Figure 7:
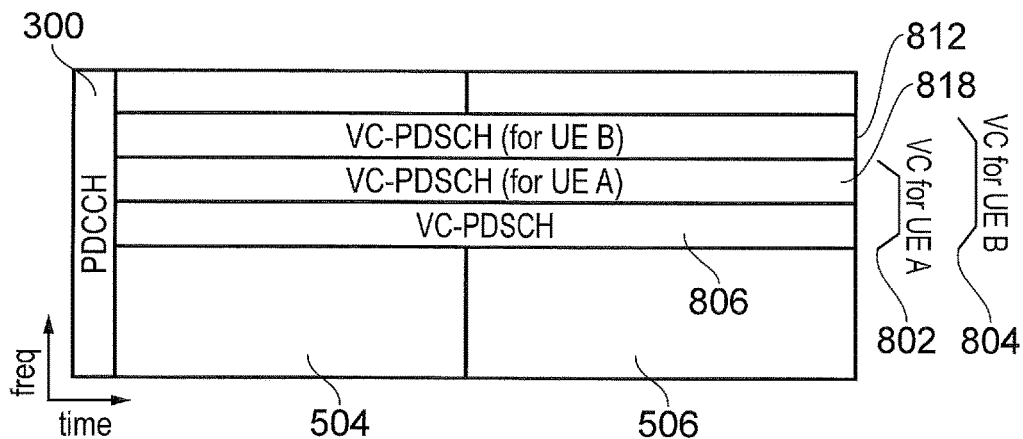
FIG. 7 provides a schematic diagram of an LTE downlink radio sub-frame which illustrates a wireless access interface provided by a mobile communications network which includes allocating communications resources for two classes of communications devices and includes a down-link control channel.

A further example is shown in FIG. 7. In FIG. 7, two classes of devices are identified as being able to communicate via first and second frequency bands 802, 804. However, unlike the examples shown in FIG. 6 in which the downlink resources are allocated by communicating resource allocation messages in a VC-PDCCH 602, the example shown in FIG. 7 provides a so-called enhanced downlink control channel ePDCCH which is provided within a separate bandwidth 806 and extends substantially from the downlink control channel of the host carrier 300, across two example frames of the wireless access interface 504, 506. This enhanced downlink control channel (ePDCCH) is provided to allocate communications resources, which is narrow in frequency but wide in time in contrast to the host PDCCH which is narrow in time but wide in frequency. A second class of communications devices class B is able to allocate in a wider bandwidth 804 within the host communications bandwidth 810 and so can be allocated shared channel resources within an extended region 812 (VC-PDSCH (for UE B)). In contrast the class A devices can only be allocated shared communications resources within the class A bandwidth 802 within the shared resources provided by class A devices 818. Accordingly, for the examples shown in FIG. 7, downlink control messages are communicated by the ePDCCH 806 which occupies a narrow bandwidth frequency but an entire duration of one subframe (two slots) which would otherwise be occupied by shared channel resources for communicating downlink control channel messages to for both class A and class B communications devices. In this example, the class A and class B devices can receive downlink control link messages from the ePDCCH 806 for allocating shared channel communications resources within the two different bandwidths 802, 804. Thus class A devices receive bandwidth allocations within the smaller bandwidth 802 that is within the shared resources 818, whereas although class B devices also receive downlink control channel resource allocation messages from the ePDCCH 806, these class B devices may be allocated communications resources for downlink communication within both the class A bandwidth 818 and the class B bandwidth 812.

Communications devices (UEs) operating in accordance with the present technique are arranged to exchange information with the mobile communications network in order to identify which class of a plurality of classes of reduced capability devices the communications device belongs. As illustrated above, with the three classes, class A, class B, class C each class corresponds to a predetermined bandwidth within which the communications device can receive for example downlink communications signals within a shared resource. According the present technique therefore, a communications device exchanges messages with the mobile communications network in order to identify which class the device belongs. The messages identify at least a bandwidth of the communications device within which the communications device can receive downlink signals and therefore can be allocated downlink shared resources within that bandwidth. An example arrangement in which the communications device sends and receives messages from the mobile network in order to establish which class the device belongs is shown in FIG. 8.

Figure 8:
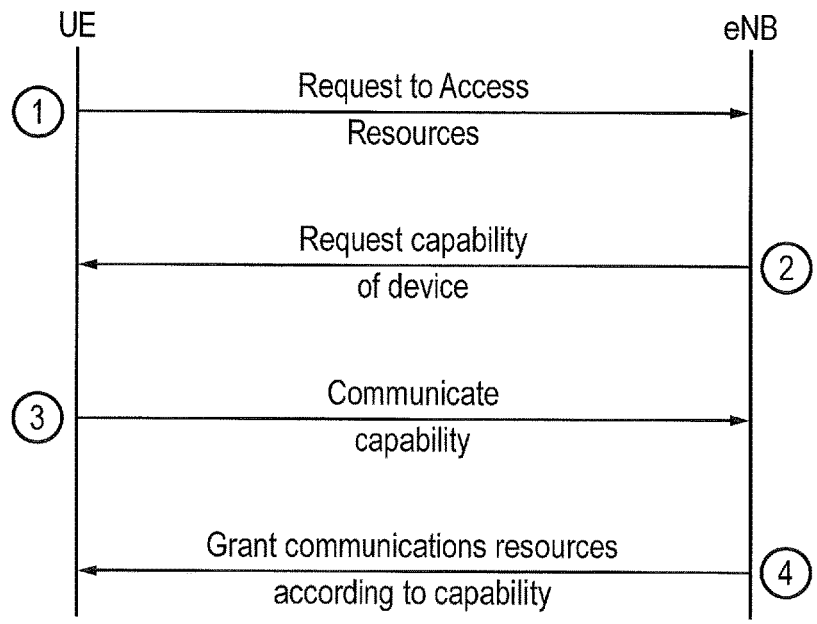
FIG. 8 is an example diagram representing a message exchange during an attach procedure according to the present technique.

In FIG. 8 in step 1 a communications device transmits a request to access the communications resources of the wireless access interface. For example, the request to access the communications resources may be an attach procedure in which the communications device first powers on and attaches to the mobile network by being affiliated with a particular base station which may be an eNodeB. Thus, in step 1 a request to access the communications resources is sent to the base station eNodeB. In response, the mobile network communicates a request to identify a capability of the communications device in step 2. In step 3 the mobile communications device responds by indicating which class the communications device belongs. For example, this could be a field in a message sent as part of an attach procedure to the mobile communications network which may include a field identifying which of the classes the communications device belongs. In response, the eNodeB grants communications resources in step 4 by communicating the resources which are allocated to the communications device (UE) in correspondence with a capability of a device from the class of that device.

Primary and Secondary Virtual Carrier Examples

Figure 9:
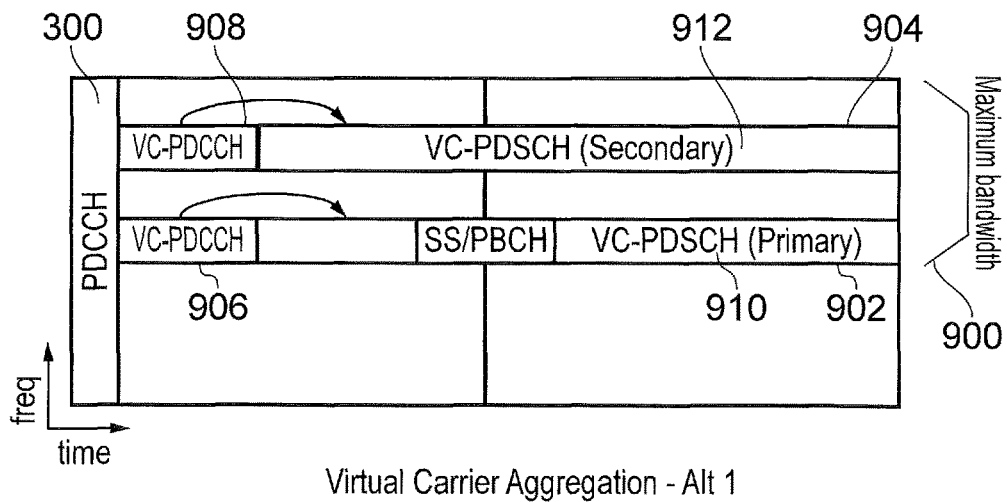
FIG. 9 provides a schematic diagram of an LTE downlink radio sub-frame which illustrates a wireless access interface provided by a mobile communications network which includes allocating communications resources for primary and secondary virtual carriers, which may be aggregated.
Figure 10:
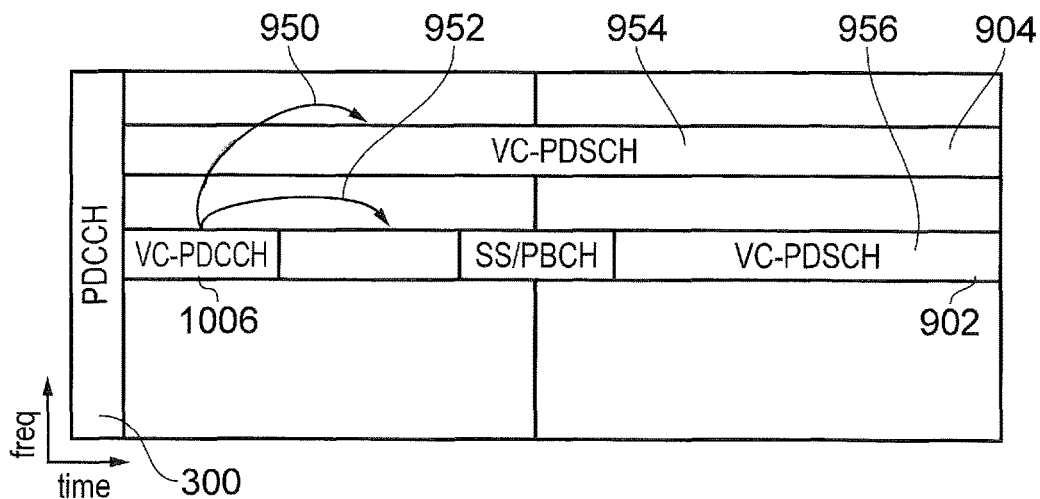
FIG. 10 provides a schematic diagram of an LTE down-link radio sub-frame which illustrates a further example of wireless access interface provided by a mobile communications network for the example shown in FIG. 9 in which a down-link control channel is provided for only the primary virtual carrier.
Figure 11:
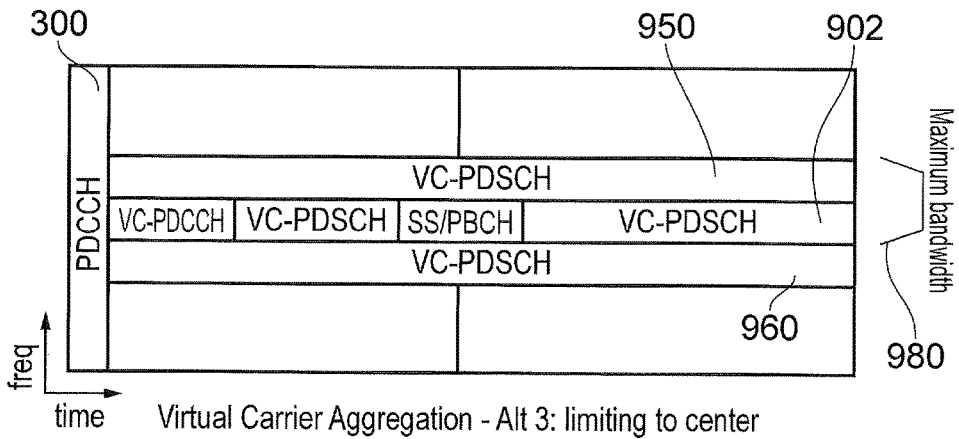
FIG. 11 provides a schematic diagram of an LTE down-link radio sub-frame which illustrates a further example of wireless access interface provided by a mobile communications network which includes allocating communications resources from an extended bandwidth where these resources are accessible to a communications device.

Further example of embodiments of the present technique are illustrated with reference to FIGS. 9 to 13 in which a wireless access interface is provided with at least a primary and a secondary virtual carrier within a host carrier. FIG. 9 provides an illustration of such a situation which corresponds to the example shown in FIG. 5. However, from the example shown in FIG. 9, two virtual carriers have been provided within a maximum bandwidth available to communications devices 900. Thus, as shown in FIG. 11 alongside the downlink control channel for the host carrier 300, two virtual carriers are provided 902, 904 in which each is provided with a separate downlink control channel 906, 908 for communicating resource allocation messages to communications devices allocating downlink shared resources within a first downlink shared virtual carrier VC-PDSCH 910. The first downlink shared virtual carrier VC-PDSCH 910 is a primary shared resource with a first set of communications resources for preferable allocation to reduced capability devices. Also shown for the example embodiment of FIG. 9 is a secondary shared resource 912 within the second virtual carrier 904. The arrangement shown in FIG. 9 therefore provides an example in which two virtual carriers exist and are hosted by a mobile communications network, which may be supported outside a centre frequency and configured identically to the primary virtual carrier without the central control channels PSS/SSS/PBCH, but includes a VC-PDCCH from the primary virtual carrier. Embodiments of the present technique therefore provide an arrangement for more resource to be allocated for MTC-type devices, which can therefore reduce congestion on the centre frequency or primary virtual carrier using virtual carrier aggregation. This is because a communications device which has a maximum bandwidth 900 can use either of the virtual carriers 902, 904.

Embodiments of the present technique can also provide an advantage by reducing the cost of the different classes of MTC-type devices compared to conventional full-bandwidth devices, because the maximum supported bandwidth could be reduced to (highest frequency relevant to a terminal—lowest frequency relevant to a terminal). This advantage could be particularly applicable where a network operator and a device manufacturer can collaborate to ensure such bandwidths are allocated.

As will be appreciated although the arrangements shown in FIG. 9 provides a separate downlink control channel for allocating resources within the shared channel for the second virtual carrier 904, the balance of communications resources to the control channels for communicating resource allocation message with respect to the shared channel resources means that some capacity can be underutilised in that the second downlink shared channel 908 of the second virtual carrier 904. Accordingly, an alternative arrangement is shown in FIG. 10 in which the second virtual carrier 904 does not include a separate downlink control channel 908. For this example, therefore, a downlink control channel of the primary virtual carrier 902 (VC-PDCCH 1006) is arranged to allocate shared resources to a communications device with an operating bandwidth 900 as illustrated by arrows 950, 952. Thus, in contrast the examples shown in FIG. 9 an aggregated arrangement of virtual carriers is provided in which a downlink control channel 1006 provided on the centre frequencies of the primary virtual carrier 902 allocates communications resources which are shared in both the primary virtual carrier 902 and the secondary virtual carrier 904 which forms a combined shared channel resource for reduced capability devices comprising regions 954, 956. According to the example shown in FIG. 10, not only are the PSS/SSS/PBCH control channels provided in the primary virtual carrier but also the down-link control channel for allocating the shared channel resources (VC-PDCCH). This may allow for more flexible and efficient resource allocation.

A further example is illustrated in FIG. 11 which corresponds to the example shown in FIG. 10 except that the secondary virtual carrier 950, 960 is allocated within a central region close to or contiguous with the primary virtual carrier. According to this example embodiment communications resources can be allocated to communications devices with a lower operating bandwidth 980 compared to that shown in FIG. 10. As will be appreciated from the example shown in FIG. 11, a communications device with an operating bandwidth 980 could be allocated shared channel resources from a secondary bandwidth 950 or a secondary bandwidth 960 which is below that of the virtual carrier in the centre bandwidth which is the primary virtual carrier 902. Accordingly, the arrangement shown in FIG. 11 provides some additional flexibility. This is because, by providing this arrangement from the wireless communications bandwidth the location of secondary virtual carrier resources can reduce a maximum supported bandwidth of a communications devices which is required to VC Bandwidth x (n+1) where n is the number of contiguously-placed secondary virtual carriers that the communications device can support.

Figure 12:
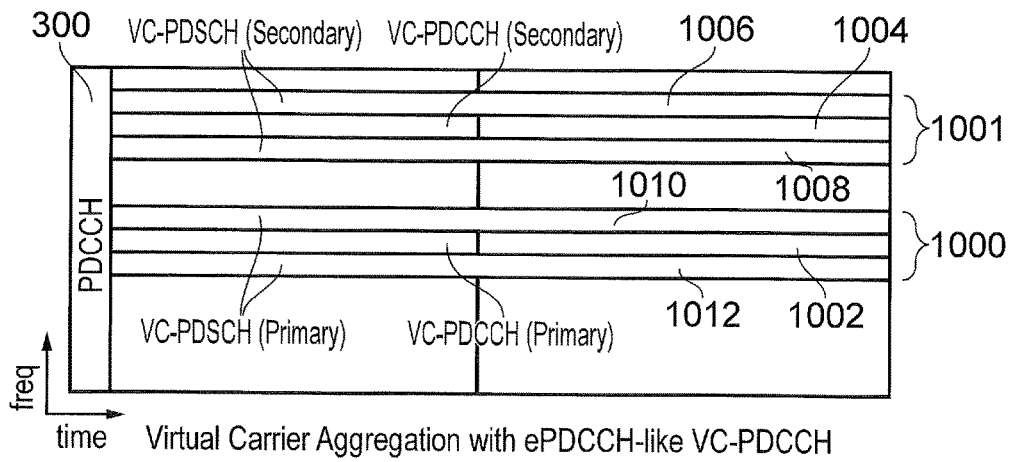
FIG. 12 provides a schematic diagram of an LTE down-link radio sub-frame which illustrates a further example of wireless access interface provided by a mobile communications network which includes allocating communications resources for primary and secondary virtual carriers.
Figure 13:
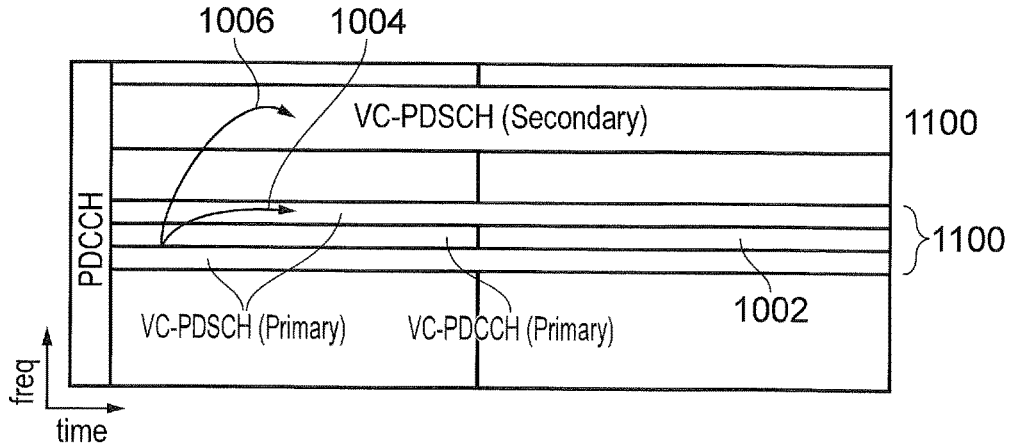
FIG. 13 provides a schematic diagram of an LTE down-link radio sub-frame which illustrates a further example of wireless access interface provided by a mobile communications network which includes allocating communications resources for primary and secondary virtual carriers and in which only the primary virtual carrier includes a downlink control channel resource.

Further examples of the present technique are illustrated in FIGS. 12 and 13. In FIGS. 12 and 13 a first and a secondary virtual carrier is provided 1000, 1001 in which each has a narrow band but wide duration downlink control channel 1002, 1004 (VC-PDCCH) and shared channel resources (VC-PDSCH) within a remaining part of the operating bandwidth 1006, 1008, 1010, 1012. Thus, for the example shown in FIG. 12, two separate virtual carriers are provided, each of which has a so-called enhanced downlink control channel VC-ePDCCH which communicates downlink resource allocation messages to the communications terminals which are able to communicate within the primary virtual carrier 1000 or the secondary virtual carrier 1001. However, again from the example illustrated with reference to FIGS. 10 and 11, there could be an over-capacity in downlink control channel resources compared to those of the shared channel resources. Accordingly, in FIG. 13, the secondary virtual carrier 1001 has been adapted to remove a downlink control channel 1004 of the secondary virtual carrier, so that the secondary virtual carrier 1100 contains only shared channel resources (VC-PDSCH) whereas the primary virtual carrier 1000 corresponds substantially to the example shown in FIG. 12. Again, according to this example the downlink control channel which is allocated resource allocation messages for downlink resources in the primary virtual carrier 1000, 1002 allocates resources within the secondary virtual carrier 1100 or the remaining shared channel resources within the primary virtual carrier 1000 as illustrated by resource allocation indicated as arrows 1004, 1006. Accordingly, there is an improvement in the efficiency with which the resources of the wireless access interface are used because there is a relative reduction in the capacity given to downlink control channel resources and an increase in the shared channel resources by removing the enhanced downlink shared channel from the secondary virtual carrier from 1100.

Example Mobile Communications System

Figure 14:
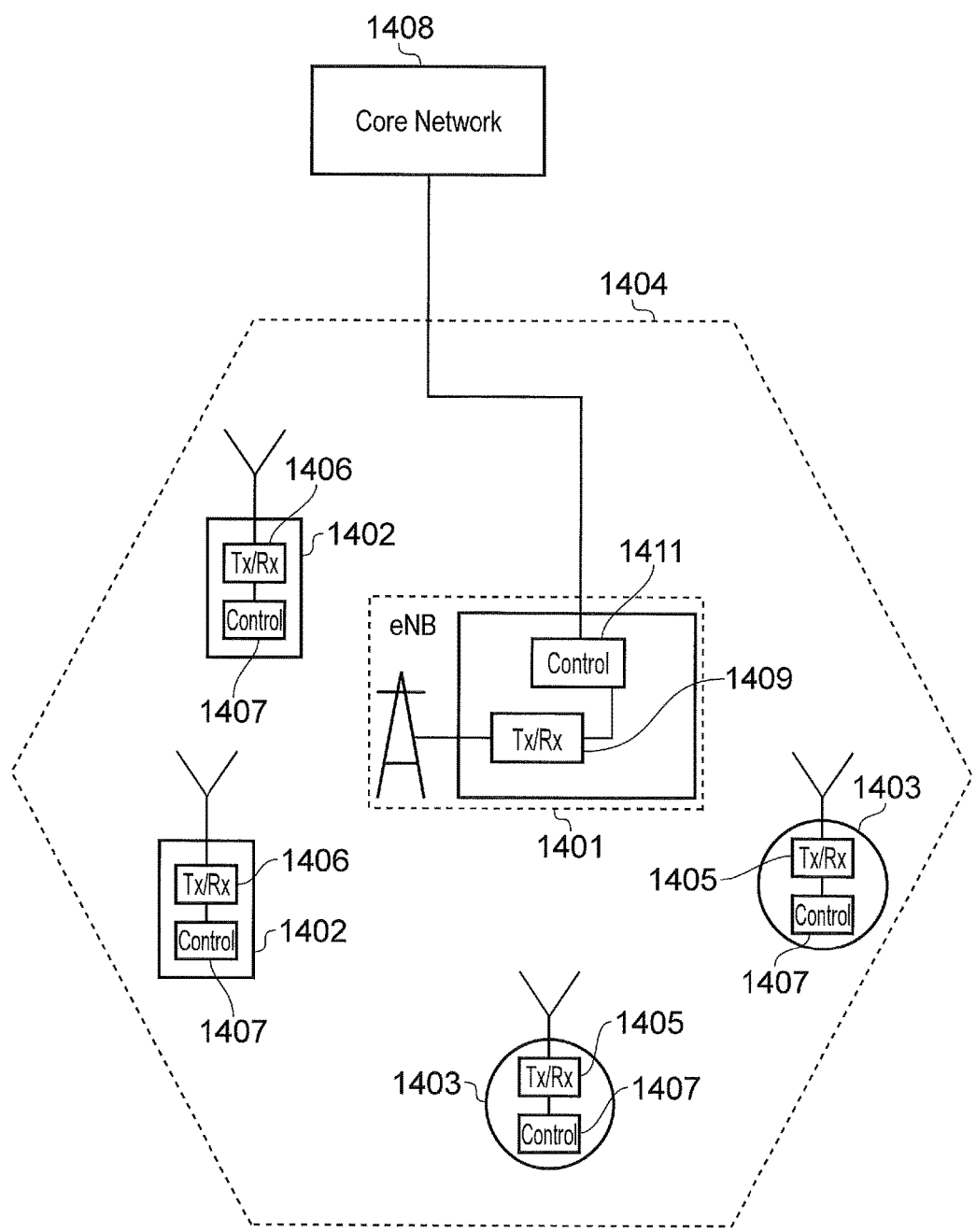
FIG. 14 is a schematic block diagram of a mobile communications system according to one example of the present technique.

FIG. 14 provides a schematic diagram showing part of an adapted LTE mobile communications system. The system includes an adapted enhanced Node B (eNB) 1401 connected to a core network 1408 which communicates data to a plurality of conventional LTE devices 1402 and reduced capability devices 1403 within a coverage area (i.e. cell) 1404. Each of the reduced capability devices 1403 has a transceiver unit 1405 which includes a receiver unit capable of receiving data across a reduced bandwidth and a transmitter unit capable of transmitting data across a reduced bandwidth (or full bandwidth of an uplink carrier supported by the eNB 1401) when compared with the capabilities of the transceiver units 1406 included in the conventional LTE devices 1402.

The adapted eNodeB 1401 is arranged to transmit downlink data using a sub-frame structure that includes a virtual carrier as described above for example with reference to FIGS. 4 to 13. A transmitter and receiver unit 1409 forms a wireless access interface under the control of a controller 1411, which also performs the function of an adapted scheduler. The reduced capability devices 1403 are thus able to receive and transmit data using the uplink and/or downlink virtual carriers as described above and may be considered as comprising different classes of devices. Each class may have a different bandwidth capability, which can provide an arrangement for allocating resources outside the virtual carrier or conceptually an extended virtual carrier.

As has been explained above, because the reduced complexity devices 1403 receive data across a reduced bandwidth downlink virtual carriers, the complexity, power consumption and cost of the transceiver unit 1405 needed to receive and decode downlink data and to encode and transmit uplink data is reduced compared to the transceiver unit 1406 provided in the conventional LTE devices.

When receiving downlink data from the core network 1408 to be transmitted to one of the devices within the cell 1404, the adapted eNodeB 1401 is arranged to determine if the data is bound for a conventional LTE device 1402 or a reduced capability device 1403. This can be achieved using any suitable technique. For example, data bound for a reduced capability device 1403 may include a virtual carrier flag indicating that the data must be transmitted on the downlink virtual carrier. If the adapted eNodeB 1401 detects that downlink data is to be transmitted to a reduced capability device 1403, a controller 1411 included in the adapted eNodeB 1401 ensures that the downlink data is transmitted to the reduced capability device in question on the downlink virtual carrier. In another example the network is arranged so that the virtual carrier is logically independent of the eNodeB. More particularly the virtual carrier can be arranged to appear to the core network as a distinct cell. From the perspective of the core network it is not known that the virtual carrier is physically co-located with, or has any interaction with, the host carrier of the cell. Packets are routed to/from the virtual carrier just as they would be for any normal cell.

Figure 15:
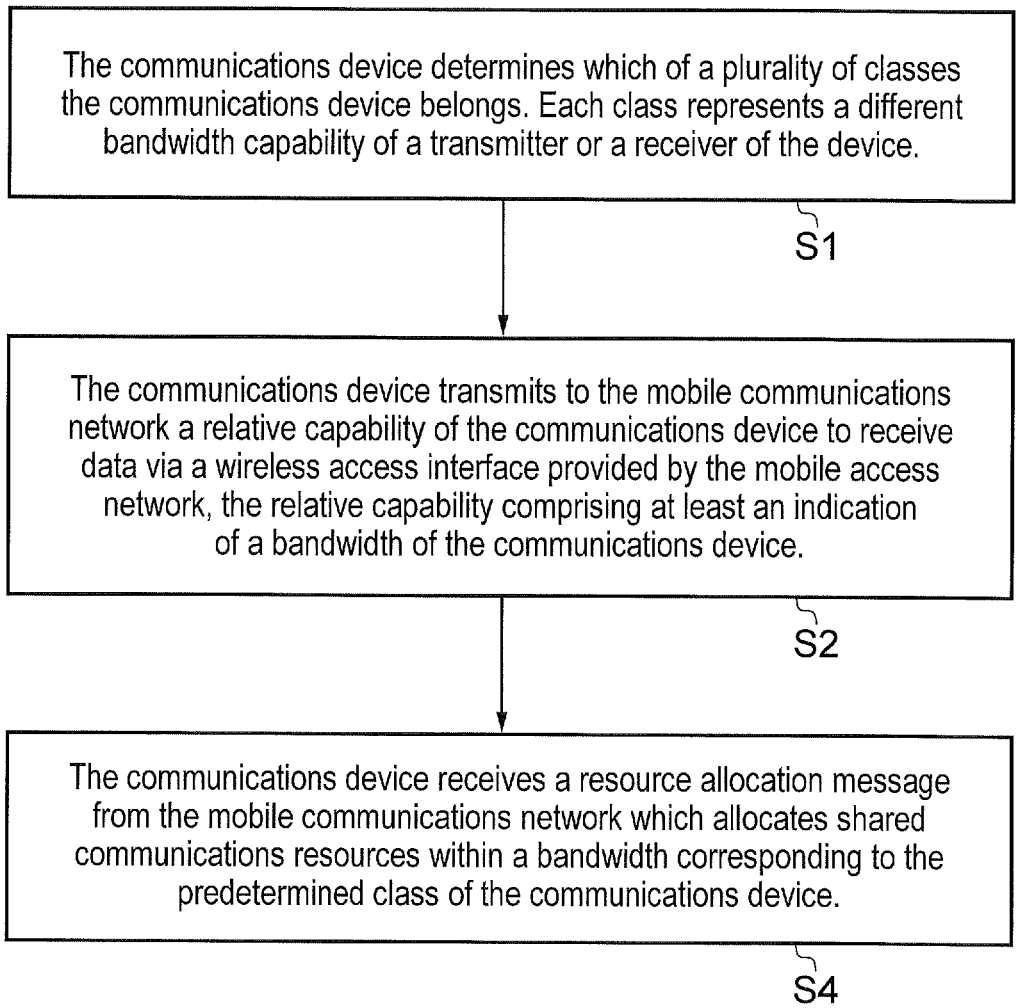
FIG. 15 is a flow diagram illustrating the operation of a communications device (UE) according to the present technique.

The operation of a communications device according to the present technique is summarised by the flow diagram in FIG. 15, which is summarised as follows:

S1: A communications device determines which of a plurality of classes the communications device belongs. Each class represents at least a different bandwidth capability of a transmitter or a receiver of the device. The allocation of the class to a device can be determined by the network during an initial attach procedure or may be predetermined by a network operator and pre-stored in the device.

S2: The communications device transmits to the mobile communications network the relative capability of the communications device to receive data via a wireless access interface provided by the mobile access network. The relative capability according to the allocated class of device includes at least an indication of a bandwidth of the communications device.

S4: The communications device receives a resource allocation message from the mobile communications network which allocates shared communications resources within a bandwidth corresponding to the predetermined class of the communications device. The allocated resources may be outside the bandwidth of the virtual carrier or may be an extension of the virtual carrier.

Figure 16:
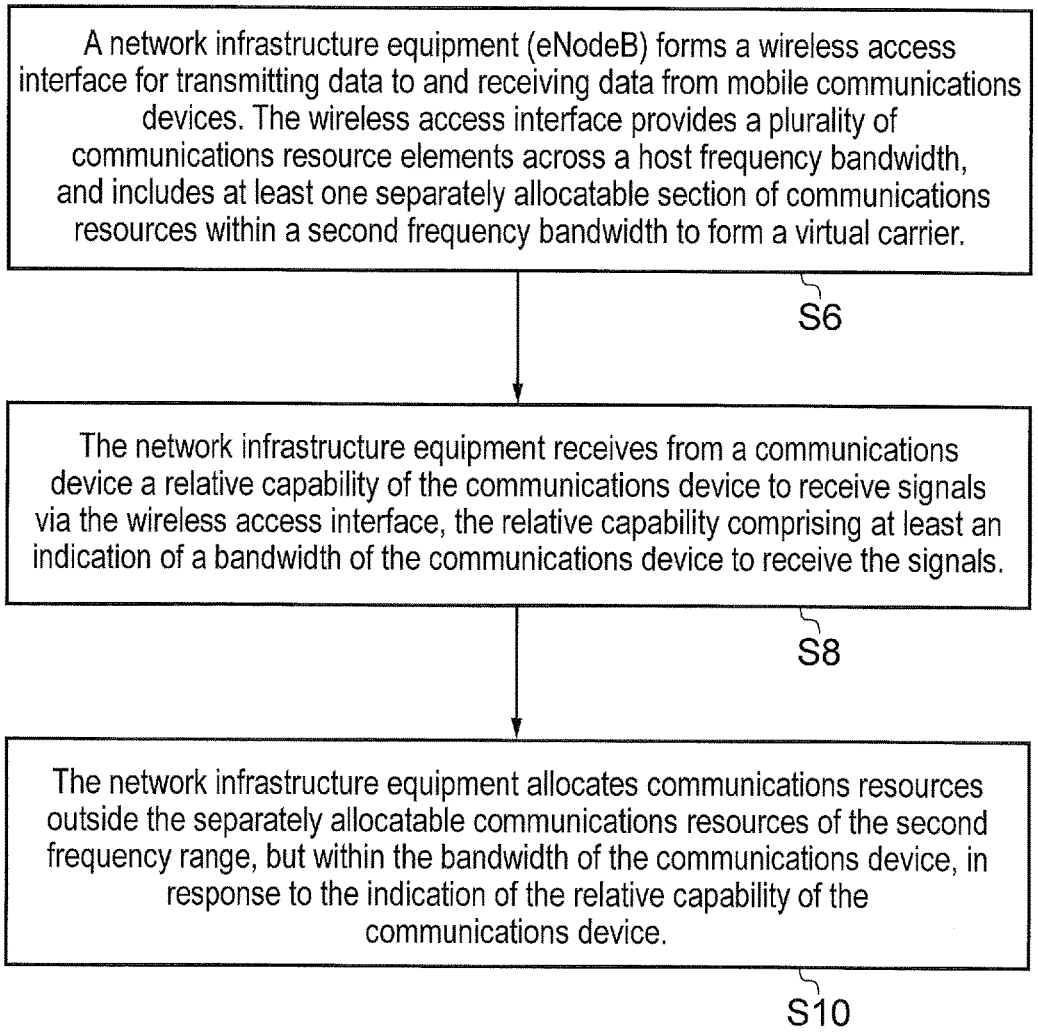
FIG. 16 is a flow diagram illustrating the operation of a mobile communications network according to the present technique.

The operation of a network device such as a mobile communications infrastructure equipment is illustrated by the example provided in FIG. 16 and summarised as follows:

S6: A network infrastructure equipment (e.g. eNodeB) provides a wireless access interface for transmitting data to and receiving data from mobile communications devices using a transmitter and a receiver. The wireless access interface provides a plurality of communications resource elements across a host frequency bandwidth, and includes at least one section of communications resources for preferable allocation to reduced capability devices within a virtual carrier bandwidth. The virtual carrier bandwidth is within the host frequency bandwidth, the communications resources within the virtual carrier bandwidth being provided for preferable allocation to communications devices to receive signals representing the data transmitted within the virtual carrier bandwidth so as to form a virtual carrier.

S8: The network infrastructure equipment receives from a communications device a relative capability of the communications device. The relative capability can be provided as an indication of a class to which the device belongs and indicates an ability to receive signals representing the data via the wireless access interface, and indicates at least a bandwidth of the communications device to receive the signals.

S10: The network infrastructure equipment allocates communications resources outside the the first virtual carrier, but within the bandwidth of the communications device, in response to the indication of the relative capability of the communications device.

Various further aspects and features of the present disclosure are defined in the appended claims. Various combinations of the features of the dependent claims may be made with those of the independent claims other than the specific combinations recited for the claim dependency. Embodiments of the present disclosure have been defined largely in terms of reduced capability devices transmitting data via a virtual carrier inserted in a conventional LTE based host carrier. However, it will be understood that any suitable device can transmit and receive data using the described virtual carriers for example devices which have the same capability as a conventional LTE type device or devices which have enhanced capabilities.

Further examples of the present technique include an infrastructure equipment or network element for forming part of a mobile communications network comprising a transmitter unit configured to transmit data to communications devices via a wireless access interface, a receiver unit configured to receive data transmitted from communications devices via the wireless access interface, and a controller. The controller is configured to control the transmitter unit and the receiver unit to form the wireless access interface providing a plurality of communications resource elements across a host frequency bandwidth, and including, within the host frequency bandwidth, a first section of communications resource elements within a first frequency bandwidth for allocation preferably to reduced capability devices to receive signals representing the data transmitted by the transmitter unit within the first bandwidth forming a first virtual carrier, the reduced capability devices each having a receiver bandwidth which is greater than or equal to the first frequency bandwidth but less than the host frequency bandwidth. The controller is configured in combination with the transmitter unit and the receiver unit to receive from a communications device a relative capability of the communications device to receive signals representing the data via the wireless access interface, the relative capability comprising at least an indication of a relative bandwidth of the communications device to receive the signals within the host frequency range greater than or equal to the first bandwidth, and to allocate communications resource elements which include communications resource elements which are outside the first frequency bandwidth, but within the bandwidth of the communications device, in response to the indication of the relative capability of the communications device.

In one example the infrastructure equipment allocates the communications resource elements outside the first bandwidth to the communications device in dependence upon a capacity of the first virtual carrier and a demand on the communications resource elements of the first virtual carrier by the reduced capability devices. The controller in combination with the transmitter unit and the receiver unit may be configured to receive signals from and/or transmit signals to communications devices in accordance with a one of a predetermined set of classes of communications devices, each class defining a different frequency bandwidth within which the communications device can receive signals from the infrastructure equipment, and to transmit a resource allocation message to the communications device which allocates shared communications resource elements to the communications device within a bandwidth corresponding to one of a predetermined number of classes of the communications device.

Furthermore the controller may be configured in combination with the receiver unit to receive from one of the communications devices the class of the communications device from one of the predetermined classes, each class defining a different frequency bandwidth within which the communications device can receive signals from the wireless access interface.

The following numbered clauses provide further example aspects and features of the present technique:

1. An infrastructure equipment for forming part of a mobile communications network, the infrastructure equipment comprising:

a transmitter unit configured to transmit data to communications devices via a wireless access interface, a receiver unit configured to receive data transmitted from communications devices via the wireless access interface, and a controller configured to control the transmitter unit and the receiver unit to form the wireless access interface providing a plurality of communications resource elements across a host frequency bandwidth, and including, within the host frequency bandwidth, a first section of communications resource elements within a first frequency bandwidth for allocation preferably to reduced capability devices to receive signals representing the data transmitted by the transmitter unit within the first bandwidth forming a first virtual carrier, the reduced capability devices each having a receiver bandwidth which is greater than or equal to the first frequency bandwidth but less than the host frequency bandwidth, and the controller is configured in combination with the transmitter unit and the receiver unit to receive from a communications device a relative capability of the communications device to receive signals representing the data via the wireless access interface, the relative capability comprising at least an indication of a relative bandwidth of the communications device to receive the signals within the host frequency range greater than or equal to the first bandwidth, and to allocate communications resource elements which include communications resource elements which are outside the first frequency bandwidth, but within the bandwidth of the communications device, in response to the indication of the relative capability of the communications device.

2. An infrastructure equipment according to clause 1, wherein the infrastructure equipment allocates the communications resource elements outside the first bandwidth to the communications device in dependence upon a capacity of the first virtual carrier and a demand on the communications resource elements of the first virtual carrier by the reduced capability devices.

3. An infrastructure equipment according to clause 1 or 2, wherein the controller in combination with the transmitter unit and the receiver unit are configured to receive signals from and/or transmit signals to communications devices in accordance with a one of a predetermined set of classes of communications devices, each class defining a different frequency bandwidth within which the communications device can receive signals from the infrastructure equipment, and to transmit a resource allocation message to the communications device which allocates shared communications resource elements to the communications device within a bandwidth corresponding to one of a predetermined number of classes of the communications device.

4. An infrastructure equipment according to clause 3, wherein the controller is configured in combination with the receiver unit to receive from one of the communications devices the class of the communications device from one of the predetermined classes, each class defining a different frequency bandwidth within which the communications device can receive signals from the wireless access interface.

5. An infrastructure equipment according to clause 4, wherein the controller is configured in combination with the transmitter unit and the receiver unit to transmit in response to receiving a request to attach to the mobile communications network a request to communicate an indication of the class to which the communications device belongs, and to receive in response to the transmitted request for the class of the communications device an indication of the class of the communications device.

6. An infrastructure equipment according to any of clauses 1 to 5, wherein the controller is configured in combination with the transmitter unit and the receiver unit to form the wireless access interface with a second virtual carrier providing a second section of communications resource elements for preferable allocation to the reduced capability devices within a second bandwidth, within the host frequency bandwidth of the wireless access interface, to transmit signalling information providing the location of the second virtual carrier, and in accordance with a capability of the communications devices, to transmit signals representing data to one of the communications devices from communications resource elements of the second virtual carrier and the first virtual carrier.

7. An infrastructure equipment according to clause 6, wherein the controller is configured in combination with the transmitter unit and the receiver unit to form the wireless access interface with the first virtual carrier, which includes a control channel for communicating messages to the communications device to allocate communications resource elements of the first and second virtual carriers, and to transmit a resource allocation message on the control channel to the communications device, the resource allocation message allocating communications resource elements within the first and second virtual carriers, and to transmit signals from the allocated communications resource elements of the first and second virtual carriers to the reduced capability communications devices.

8. An infrastructure equipment according to any of clauses 1 to 7, wherein the first virtual carrier is located substantially at centre of the host frequency bandwidth.

9. An infrastructure equipment according to clause 8, wherein the first virtual carrier bandwidth includes one or more other control channels for providing other control information, and the controller is configured in combination with the receiver unit to receive other control information from the other control channels.

10. A method of communicating with a communications device from an infrastructure equipment for forming part of a mobile communications network, the method comprising:

transmit data to communications devices via a wireless access interface, and receiving data transmitted from communications devices via the wireless access interface, the wireless access interface providing a plurality of communications resource elements across a host frequency bandwidth, and including, within the host frequency bandwidth, a first section of communications resource elements within a first frequency bandwidth for allocation preferably to reduced capability devices to receive signals representing the data transmitted by the transmitter unit within the first bandwidth forming a first virtual carrier, the reduced capability devices each having a receiver bandwidth which is greater than or equal to the first frequency bandwidth but less than the host frequency bandwidth, and receiving from a communications device a relative capability of the communications device to receive signals representing the data via the wireless access interface, the relative capability comprising at least an indication of a relative bandwidth of the communications device to receive the signals within the host frequency range greater than or equal to the first bandwidth, and allocating communications resource elements which include communications resource elements which are outside the first frequency bandwidth, but within the bandwidth of the communications device, in response to the indication of the relative capability of the communications device.

11. A method according to clause 10, wherein the allocating communications resource elements outside the first frequency range of the first virtual carrier comprises allocating the communications resource elements outside the first virtual carrier to the communications device in dependence upon a capacity of the first virtual carrier and a demand on the communications resource elements of the first virtual carrier by the reduced capability devices.

12. A method according to clause 10 or 11, wherein the allocating communications resource elements which include communications resource elements which are outside the first frequency bandwidth comprises receiving signals from and/or transmitting signals to communications devices in accordance with a one of a predetermined set of classes of communications devices, each class defining a different frequency bandwidth within which the communications device can receive signals from the infrastructure equipment, and transmitting a resource allocation message to the communications device which allocates shared communications resource elements to the communications device within a bandwidth corresponding to one of a predetermined number of classes of the communications device.

13. A method according to clause 12, wherein the allocating communications resources outside the first virtual carrier comprises receiving from one of the communications devices the class of the communications device from one of the predetermined classes, each class defining a different frequency bandwidth within which the communications device can receive signals from the wireless access interface.

14. A method according to clause 13, wherein the receiving from one of the communications devices the class of the communications device from one of the predetermined classes comprises transmitting in response to receiving a request to attach to the mobile communications network a request to communicate an indication of the class to which the communications device belongs, and receiving in response to the transmitted request for the class of the communications device an indication of the class of the communications device.

15. A method according to any of clauses 10 to 14, wherein the allocating communications resources outside the first virtual carrier comprises forming the wireless access interface with a second virtual carrier providing a second section of communications resource elements for preferable allocation to the reduced capability devices within a second bandwidth, within the host frequency bandwidth of the wireless access interface, transmitting signalling information providing the location of the second virtual carrier, and in accordance with a capability of the communications devices, transmitting signals representing data to one of the communications devices from communications resource elements of the second virtual carrier and the first virtual carrier.

16. A method according to clause 14 or 15, wherein the forming the wireless access interface with the first virtual carrier, comprises forming the wireless access interface with the first virtual carrier, which includes a control channel for communicating messages to the communications device to allocate communications resource elements of the first and second virtual carriers, transmitting a resource allocation message on the control channel to the communications device, the resource allocation message allocating communications resource elements within the first and second virtual carriers, and transmitting signals from the allocated communications resource elements of the first and second virtual carriers to the reduced capability communications devices.

17. A method according to any of clauses 10 to 16, wherein the first virtual carrier is located substantially at centre of the host frequency bandwidth.

18. A method according to clause 17, wherein the first virtual carrier includes one or more other control channels for providing other control information, and the controller is configured in combination with the receiver unit to receive other control information from the other control channels.

19. A mobile communications network comprising one or more infrastructure equipment configured to form a wireless access interface for transmitting data to or receiving data from communications devices, the wireless access interface providing a plurality of communications resource elements across a host frequency bandwidth, and including within the host frequency bandwidth, a first section of communications resource elements within a first frequency bandwidth for allocation preferably to reduced capability devices to receive signals representing the data transmitted by the transmitter unit within the first bandwidth forming a first virtual carrier, the reduced capability devices each having a receiver bandwidth which is greater than or equal to the first frequency bandwidth but less than the host frequency bandwidth, and the infrastructure equipment is configured to receive from a communications device a relative capability of the communications device to receive signals representing the data via the wireless access interface, the relative capability comprising at least an indication of a relative bandwidth of the communications device to receive the signals within the host frequency range greater than or equal to the first bandwidth, and to allocate communications resources elements which include communications resource elements which are outside the first frequency bandwidth, but within the bandwidth of the communications device, in response to the indication of the relative capability of the communications device.

20. A mobile communications network according to clause 19, wherein the infrastructure equipment is configured to receive signals from and/or transmit signals to communications devices in accordance with a one of a predetermined set of classes of communications devices, each class defining a different frequency bandwidth within which the communications device can receive signals from the infrastructure equipment, and to transmit a resource allocation message to the communications device which allocates shared communications resource elements to the communications device within a bandwidth corresponding to one of a predetermined number of classes of the communications device.

21. A mobile communications network according to clause 20, wherein the infrastructure equipment is configured
to receive from one of the communications devices the class of the communications device from one of the predetermined classes, each class defining a different frequency bandwidth within which the communications device can receive signals from the wireless access interface.

22. A mobile communications system comprising a mobile communications network and a communications device,
the mobile communications network comprising one or more infrastructure equipment configured to form a wireless access interface for transmitting data to or receiving data from communications devices, the wireless access interface providing a plurality of communications resource elements across a host frequency bandwidth, and including, within the host frequency bandwidth, a first section of communications resource elements within a first frequency bandwidth for allocation preferably to reduced capability devices to receive signals representing the data transmitted by the transmitter unit within the first bandwidth forming a first virtual carrier, the reduced capability devices each having a receiver bandwidth which is greater than or equal to the first frequency bandwidth but less than the host frequency bandwidth, and the communications device is configured
to transmit to the mobile communications network a relative capability of the communications device to receive data via the wireless access interface, the relative capability comprising at least an indication of a relative bandwidth of the receiver unit within the host frequency range greater than or equal to the first bandwidth, and
the infrastructure equipment is configured
to receive from the communications device the relative capability of the communications device and in response to allocate communications resource elements which are outside the first frequency bandwidth to the communications device, but within the bandwidth of the communications device, in response to the indication of the relative capability of the communications device.

The invention claimed is:

1. A communications device that communicates with a mobile communications network, the mobile communications network including one or more network elements providing a wireless access interface for the communications device, the communications device comprising:
    a transmitter configured to transmit unlink data to the mobile communications network via the wireless access interface;
    a receiver configured to receive downlink data from the mobile communications network via the wireless access interface, wherein
    the wireless access interface provides a plurality of communications resource elements across a host frequency bandwidth, and
    the plurality of communications resource elements includes, within the host frequency bandwidth, a first section of communications resource elements forming a first virtual carrier containing a first frequency bandwidth, the first virtual carrier for allocation to reduced capability devices and including a physical downlink control channel (PDCCH) portion common to a plurality of reduced capability devices and a first physical downlink shared channel (PDSCH) portion allocated exclusively for use by another communications device, and the reduced capability devices each having a receiver bandwidth which is greater than the first frequency bandwidth but less than the host frequency bandwidth; and
    processing circuitry configured to control the transmitter transmit, to the mobile communications network, a relative capability of the receiver to receive the downlink data via the wireless access interface, the relative capability including an indication of a relative bandwidth of the receiver to receive signals within the host frequency bandwidth, the relative bandwidth being greater than the first frequency bandwidth and smaller than the host frequency bandwidth, wherein
    the receiver receives, from the mobile communications network in response to the indication an allocation of communications resource elements, the allocation of communications resource elements by the PDCCH of the first virtual carrier including communications resource elements which are outside the first frequency bandwidth and that form a second virtual carrier including a second PDSCH portion allocated exclusively for use by the communications device, but within the relative bandwidth of the receiver, and which encompass the first frequency bandwidth,
    the first virtual carrier abuts the second virtual carrier in bandwidth, and
    the second PDSCH portion of the second virtual carrier is larger in time within a subframe than the first PDSCH portion of the first virtual carrier.

2. The communications device as claimed in claim 1, wherein the mobile communications network allocates the communications resource elements outside the first frequency bandwidth based on a capacity of the first virtual carrier and a demand by the reduced capability devices.

3. The communications device as claimed in claim 1, wherein
    the transmitter is configured to transmit uplink signals and the receiver is configured to receive downlink signals according to a bandwidth corresponding to one of a predetermined set of classes of communications devices, and
    the receiver is configured to receive, from the mobile communications network, a resource allocation message which allocates communications resource elements within a bandwidth corresponding to the predetermined class of the communications device.

4. The communications device as claimed in claim 3, wherein the processing circuitry is configured to control the transmitter to communicate to the mobile communications network the class of the device from one of a predetermined set of classes, each class defining a different frequency bandwidth within which the communications device receives signals from the wireless access interface, which is greater than or equal to the first frequency bandwidth.

5. The communications device as claimed in claim 4, wherein the processing circuitry is configured to
    control the transmitter and the receiver to attach to the mobile communications network,
    control the receiver to receive, in response to attaching to the mobile communications network, a request to communicate an indication of the class to which the communications device belongs, and
    control the transmitter to transmit, in response to the received request for the class of the communications device, the indication of the class of the communications device.

6. The communications device as claimed in claim 1, wherein the receiver is configured to receive signaling information that indicates a location of the second virtual carrier within a second section of communications resource elements within the plurality of communications resource elements, the second virtual carrier for allocation to the reduced capability devices, the second virtual carrier containing a second virtual carrier bandwidth that is within the host frequency bandwidth, and in accordance with a capability of the communications device, the communications device is configured to receive signals allocating communications resource elements from the second virtual carrier and the first virtual carrier.

7. The communications device as claimed in claim 6, wherein the receiver is configured to receive the resource allocation message on the PDCCH in the first virtual carrier, the processing circuitry is configured to determine, from the resource allocation message on the PDCCH message, that the communications device has been allocated communications resource elements within one of the first virtual carrier and the second virtual carrier, and the receiver is configured to receive signals from the mobile communications network from the allocated communications resource elements of the one of the first virtual carrier and the second virtual carrier.

8. The communications device as claimed in claim 1, wherein the first frequency bandwidth of the first virtual carrier is located substantially at a center of the host frequency bandwidth.

9. The communications device as claimed in claim 8, wherein the first virtual carrier includes one or more other control channels for providing other control information, and the receiver is configured to receive other control information from the other control channels.

10. A method of communicating with a mobile communications network by a communications device, the mobile communications network including one or more network elements providing a wireless access interface for the communications device, the method comprising:

transmitting, by a transmitter of the communications device, uplink data to the mobile communications network via the wireless access interface:

receiving, by a receiver of the communications device, downlink data from the mobile communications network via the wireless access interface, wherein the wireless access interface provides a plurality of communications resource elements across a host frequency bandwidth, and the plurality of communications resource elements includes, within the host frequency bandwidth, a first section of communications resource elements forming a first virtual carrier containing a first frequency bandwidth, the first virtual carrier for allocation to reduced capability devices and including a physical downlink control channel (PDCCH) portion common to a plurality of reduced capability devices and a first physical downlink shared channel (PDSCH) portion allocated exclusively for use by another communications device, and the reduced capability devices each having a receiver bandwidth which is greater than the first frequency bandwidth but less than the host frequency bandwidth;

transmitting, by the transmitter to the mobile communications network, a relative capability of the receiver to receive the downlink data via the wireless access interface, the relative capability including an indication of a relative bandwidth of the communications device to receive signals within the host frequency bandwidth, the relative bandwidth being greater than the first frequency bandwidth and smaller than the host frequency bandwidth; and receiving, by the receiver from the mobile communications network and in response to the indication, an allocation of communications resources, the allocation of communications resource elements by the PDCCH of the first virtual carrier including communications resource elements which are outside the first frequency bandwidth and that form a second virtual carrier including a second PDSCH portion allocated exclusively for use by the communications device, but within the relative bandwidth of the receiver, and which encompass the first frequency bandwidth, wherein the first virtual carrier abuts the second virtual carrier in bandwidth, and the second PDSCH portion of the second virtual carrier is larger in time within a subframe than the first PDSCH portion of the first virtual carrier.

11. The method as claimed in claim 10, wherein the receiving the communications resources outside the first frequency bandwidth are allocated based on a capacity of the first virtual carrier and a demand by the reduced capability devices.

12. The method as claimed in claim 10, wherein the transmitter transmits the uplink signals and the receiver receives the downlink signals in accordance with a bandwidth corresponding to one of a predetermined set of classes of communications devices, and receiving the method further comprises a resource allocation message from the mobile communications network which allocates shared communications resources within a bandwidth corresponding to the predetermined class of the communications device.

13. The method as claimed in claim 12, wherein the transmitting to the mobile communications network the relative capability includes transmitting, to the mobile communications network, a class of the device from one of a predetermined set of classes, each class defining a different frequency bandwidth within which the communications device receives signals from the wireless access interface, each class having a minimum bandwidth of the virtual carrier.

14. The method as claimed in claim 13, wherein the transmitting the class of the device from one of a predetermined set of classes includes attaching to the mobile communications network, receiving, in response to attaching to the communications network, a request to communicate an indication of the class to which the communications device belongs, and transmitting, in response to the received request for the class of the communications device, the indication of the class of the communications device.

15. The method as claimed in claim 10, further comprising:

receiving signaling information that indicates a location of the second virtual carrier within a second section of communications resource elements within the plurality of communications resource elements, wherein the second virtual carrier being for allocation to reduced capability devices, and the second virtual carrier containing a second frequency bandwidth that is within the host frequency bandwidth; and receiving, in accordance with a capability of the communications device, signals representing data at the communications device from the second virtual carrier.

16. The method as claimed in claim 15, wherein the method further comprises:

receiving, at the communications device, a resource allocation message on the PDCCH in the first virtual carrier;

determining, from the resource allocation message in the PDCCH that the communications device has been allocated communications resources within one of the first virtual carrier and the second virtual carrier; and receiving signals from the mobile communications network from the allocated communications resources elements of the one of the first virtual carrier and the second virtual carrier.

17. The method as claimed in claim 10, wherein the first frequency bandwidth of the first virtual carrier is located substantially at a center of the host frequency bandwidth.

18. The method as claimed in claim 17, wherein the first virtual carrier includes one or more other control channels for providing other control information, and the method further comprises receiving other control information from the other control channels.

19. A reduced capability communication device that communicates with a mobile communications network, the mobile communications network including one or more network elements providing a wireless access interface for the communications device, the reduced capability communication device comprising:

processing circuitry configured to transmit uplink data to the mobile communications network via the wireless access interface;

receive downlink data from the mobile communications network via the wireless access interface, wherein the wireless access interface provides a plurality of communications resource elements across a host frequency bandwidth, and the plurality of communications resource elements includes, within the host frequency bandwidth, a first section of communications resource elements forming a first virtual carrier containing a first frequency bandwidth, the first virtual carrier for allocation to the reduced capability communication device and including a physical downlink control channel (PDCCH) portion common to a plurality of reduced capability devices and a first physical downlink shared channel (PDSCH) portion allocated exclusively for use by another communications device, and the reduced capability communication device having a relative bandwidth that is greater than the first frequency bandwidth but within the host frequency bandwidth;

transmit, to the mobile communications network, a relative capability of the reduced capability communication device to receive the downlink data via the wireless access interface, the relative capability including an indication of the relative bandwidth; and receive, from the mobile communications network in response to the indication, an allocation of communications resource elements, the allocation of communications resource elements by the PDCCH of the first virtual carrier including communications resource elements which are outside the first frequency bandwidth and that form a second virtual carrier including a second PDSCH portion allocated exclusively for use by the communications device, but within the relative bandwidth and which encompass the first frequency bandwidth, wherein the first virtual carrier abuts the second virtual carrier in bandwidth, and the second PDSCH portion of the second virtual carrier is larger in time within a subframe than the first PDSCH portion of the first virtual carrier.

\* \* \* \* \*